United States Patent [19]

Clemens et al.

[11] Patent Number: 5,177,958
[45] Date of Patent: Jan. 12, 1993

[54] SECONDARY AIR INJECTION VALVE AND MOUNTING SYSTEM FOR AUTOMOTIVE ENGINE

[75] Inventors: William J. Clemens, Plymouth, Mich.; Richard J. Freismuth, deceased, late of Mt. Clemens, Mich., by Joyce M. Freismuth, administratrix

[73] Assignee: Ford Motor Company, Dearborn, Mich.

[21] Appl. No.: 807,331

[22] Filed: Dec. 16, 1991

[51] Int. Cl.⁵ .............................................. F01N 3/30
[52] U.S. Cl. ........................................ 60/293; 60/304; 60/305
[58] Field of Search ................ 60/304, 305, 306, 307, 60/298, 293

[56] References Cited

U.S. PATENT DOCUMENTS

| | | | |
|---|---|---|---|
| 1,365,884 | 1/1921 | Bayne | 285/92 |
| 2,476,656 | 7/1949 | Galbraith | 285/146 |
| 3,308,908 | 3/1987 | Bunn | 188/1 |
| 3,871,175 | 3/1975 | Yamamoto | 60/307 |
| 3,913,322 | 10/1975 | Over, et al. | 60/278 |
| 4,084,373 | 4/1978 | Hashimoto et al. | 60/293 |
| 4,604,865 | 8/1986 | Otani et al. | 60/293 |
| 4,728,127 | 3/1988 | Westberg | 285/39 |
| 4,773,679 | 9/1988 | Hangebrauck | 285/256 |

Primary Examiner—Ira S. Lazarus
Assistant Examiner—L. Heyman
Attorney, Agent, or Firm—Jerome R. Drouillard; Roger L. May

[57] ABSTRACT

An air injection valve and air discharge manifold for supplying atmospheric air to the exhaust stream of an automotive engine includes an air injection valve for controlling the flow of air, with the valve including a tubular entry section and a unitary tubular exit section. The air discharge manifold includes a socket section for receiving the air injection valve and a conduit section for conducting air to the exhaust stream of the engine. The valve and air discharge manifold are connected by means of male and female rolled threads formed in the valve body and the connector portion of the air discharge manifold.

6 Claims, 2 Drawing Sheets

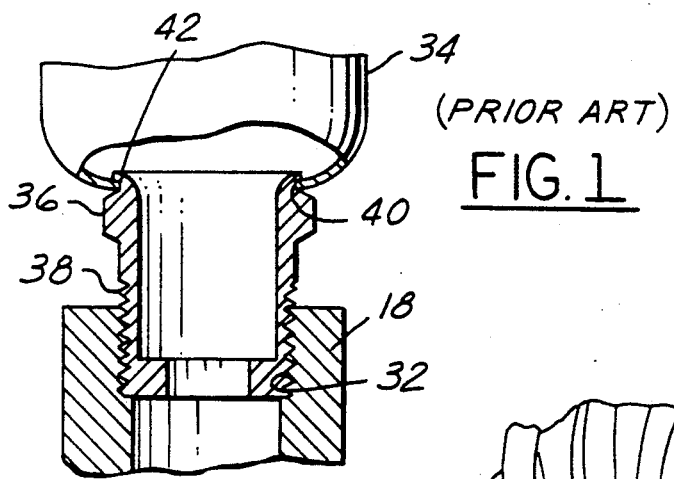
(PRIOR ART)
FIG. 1
FIG. 2
FIG. 3
FIG. 4
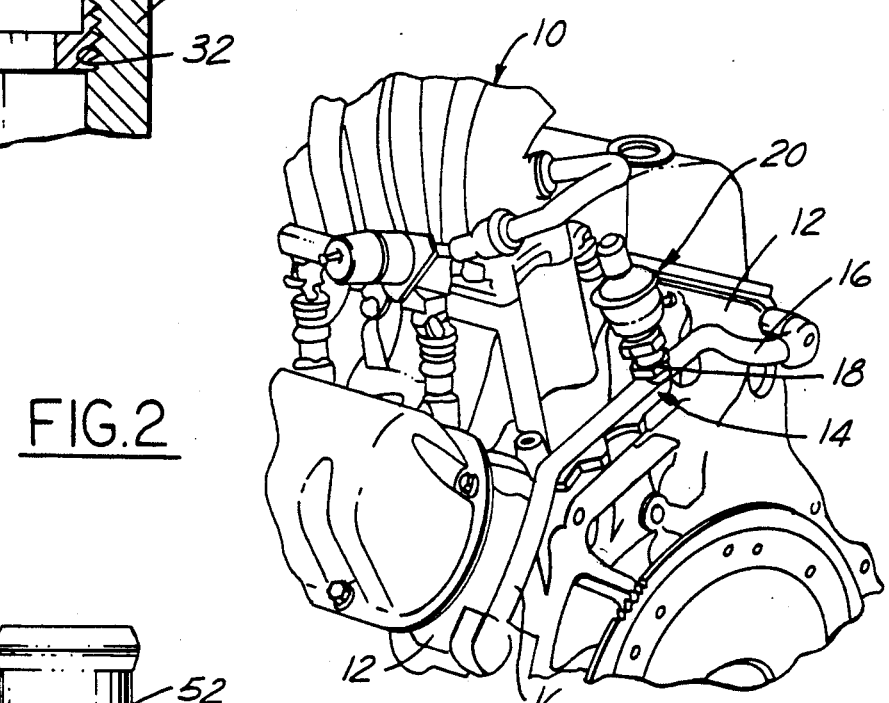
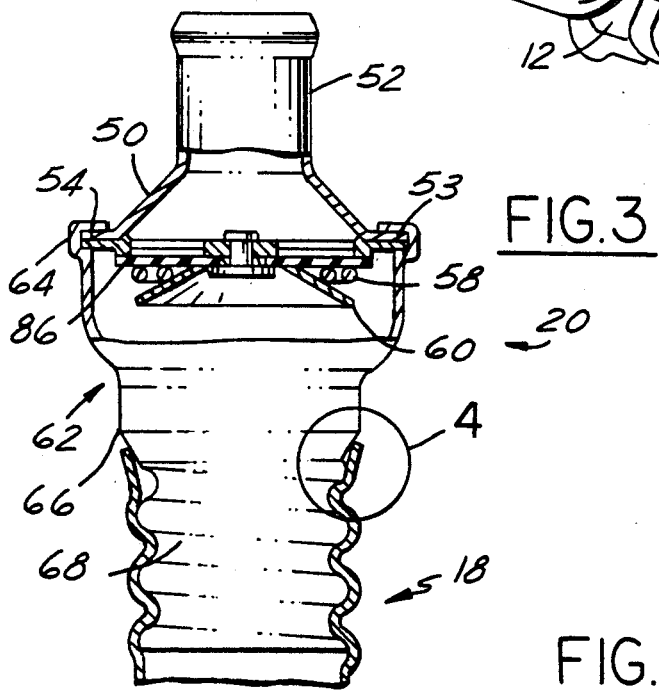
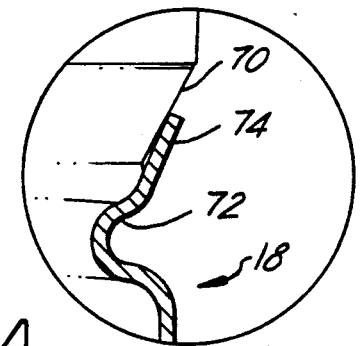

SECONDARY AIR INJECTION VALVE AND MOUNTING SYSTEM FOR AUTOMOTIVE ENGINE

FIELD OF THE INVENTION

This invention relates to a secondary air injection valve and mounting system for an automotive engine.

BACKGROUND OF THE INVENTION

Secondary air injection systems have been used with various types of automotive engines for many years. Such systems typically involve the use of an engine driven pump to deliver air through a suitable conduit system to the exhaust manifold or other parts of the exhaust system of the engine. The excess air provides additional oxygen which reacts with unburned constituents in the engine exhaust.

Design of air injection systems is complicated because flow through the systems is intermittent and condensation and resulting corrosion may develop within the systems due to the fact that the various components are not continuously purged by air passing therethrough. The present valve and mounting system are characterized by structures which are uniquely adapted to avoid corrosion problems which have rendered prior art valve and mounting systems inadequate. The air injection valve and mounting system according to the present invention uses plastically formed threads which are placed in a full-section thickness of the air injection valve body and which are engaged with similar full thickness threads formed in a receiving socket which comprises a portion of an air discharge manifold.

Press-formed threads have been used for interlocking pipes, as shown in U.S. Pat. No. 1,365,884 to Bayne, U.S. Pat. No. 2,476,656 to Galbraith, U.S. Pat. No. 3,308,908 to Bunn, U.S. Pat. No. 4,728,127 to Westberg and U.S. Pat. No. 4,773,679 to Hangebrauck. However, such interlocking structures have not been used for the purpose of mounting valve assemblies in the corrosive atmosphere of automotive engine exhaust gas.

It is an object of the present invention to provide an automotive air injection valve and mounting system which offers superior resistance to corrosion.

It is yet another object of the present invention to provide an air injection valve and mounting system which is lighter in weight than conventional systems.

It is yet another object of the present invention to provide an air injection and mounting system having fewer parts than conventional systems.

Other objects, features and advantages of the present invention will become apparent to the reader of the specification.

SUMMARY OF THE INVENTION

An air injection valve for controlling secondary air flowing into the exhaust stream of an automotive engine from a source of atmospheric air includes a tubular entry section with a first end having an adapter for receiving air from said source and an axially disposed second end. The valve further includes a unitary tubular exit section having a first end attached to the second end of said entry section and a second end having a thread formed therein to permit attachment to an air distribution manifold. A control element interposed between the entry and exit sections modulates the flow of air through the valve.

The second section of the valve preferably comprises a full thickness wall which is plastically formed into a sinuous shape. In a preferred embodiment, the thread is rolled into the second end of the valve's exit section.

The control valve of the present invention is mounted to an air discharge manifold comprising a socket section for receiving the second end of the air injection valve and a conduit section for conducting air to the exhaust stream of the engine. The socket section preferably comprises a tubular structure having threads for engaging the threaded second end of the air injection valve. The socket section preferably has a full-thickness wall with a rolled thread formed therein.

BRIEF DESCRIPTION OF THE DRAWINGS

FIG. 1 illustrates a prior art secondary air injection valve.

FIG. 2 is a perspective view of an automotive engine having a secondary air injection valve and system according to the present invention.

FIG. 3 is a plan view, partly broken away of a valve and attaching socket according to the present invention.

FIG. 4 is an enlarged view of a portion of the valve which is circled in FIG. 3.

DETAILED DESCRIPTION OF THE PREFERRED EMBODIMENTS

Figure 5:
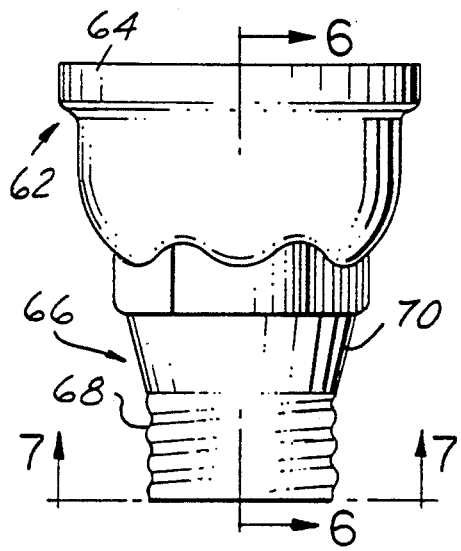
FIG. 5 is an elevation of the exit section of a valve according to the present invention.

As shown in FIG. 2, an air injection valve and air discharge manifold according to the present invention are intended to be used with an internal combustion engine. Although the engine shown is of the vee type and has two banks of cylinders, each with a separate cylinder head, a system according to the present invention could be used with an in-line engine having but one cylinder head. Continuing with FIG. 2, an engine 10 having a pair of cylinder heads, 12, is supplied with secondary air via an air injection valve, 20, which is engaged with a socket section, 18, which forms a part of an air discharge manifold, 14. The remainder of air discharge manifold 14 comprises conduit sections, 16, which extend from socket section 18 to cylinder heads 12. Air injection valve 20 is intended to be provided with pressurized air from a conventional air injection pump (not shown), and air passing through the air injection valve and air discharge manifold flows into passages within cylinder heads 12 so as to provide additional atmospheric oxygen to the gases exiting the engine. This oxygen promotes the oxidation of unburned hydrocarbons and carbon monoxide.

Those skilled in the art will appreciate in view of this disclosure that a system according to the present invention could be used to provide secondary air to parts of the exhaust system other than the cylinder head. For example, the air distribution manifold could be connected with the exhaust pipes upstream or downstream from one or more catalytic convertors. It will be further appreciated that an air source for supplying atmospheric air to the present system could comprise either a conventional air pump driven by the engine, either directly, or electrically, or a pulsed system which aspirates atmospheric air.

As shown in FIG. 3, a valve according to the present invention has a control element or check system incorporated therein. The check system allows air to flow through the valve and into the air discharge manifold, but prevents backflow of exhaust gases into the air injection valve.

Because exhaust gases are allowed to pass into the exit section of the valve up to the location of the control element, and because automotive engine exhaust gas is extremely corrosive, problems have been encountered with prior art control valves of the type shown in FIG. 1, in which an adapter 36 having male threads 38 cut therein is screwed into a socket 18 having matching female threads, 32, tapped therein. Base 34 of the prior art valve has an aperture, 40, which allows insertion of adapter 36 into the base. Note that the base and adapter are maintained in contact with one another by means of rolled over section 42 which is cold-worked over the section of base 34 which circumscribes aperture 40. This construction has proven to be disadvantageous inasmuch as corrosion of base 34 and adapter 36 in the area of rolled over section 42 has caused many valves of the type shown in FIG. 1 to fail during customer usage, and such failures have occurred even when adapter 36 has been plated or otherwise processed according to normal anti-corrosion techniques. Failure of this component is costly for the automotive manufacturer because federal requirements relating to emission control durability mandate that this valve be replaced at no cost to the consumer.

An air injection valve according to the present invention prevents corrosion problems which have beset the prior art valve shown in FIG. 1. As illustrated in FIG. 3, an air injection valve according to the present invention includes adapter 52, which receives air from a source of pressurized atmospheric air via a hose or other type of conventional connecting conduit (not shown). Adapter 52 is part of entry section 50. The entry section has a second end comprising a flange, 53, which provides an attaching structure for exit section 62.

As shown in FIG. 3, a control element is interposed between entry section 50 and exit section 62. The control element comprises a diaphragm, 86, which is clamped against a reed plate, 54, by a coil spring, 58. Spring 58 urges diaphragm 56 into contact with reed plate 54, and spring retainer 60 positions the spring accordingly. The control element within valve 20 operates as a check valve to prevent the backflow of exhaust gas through the air injection system during modes of operation in which the exhaust system pressure exceeds the pressure developed by the air pump or other means used for the purpose of delivering fresh air to the air injection system. Those skilled in the art will appreciate in view of this disclosure that other types of control elements could be used with a valve according to the present invention. For example, other types of check valves having metallic and nonmetallic valve members could be employed with the present secondary air injection valve.

As illustrated in the various FIGS. 3, 4, 5, 6 and 8, exit section 62 comprises a first end 64 which is ultimately rolled over flange 53 of entry section 50. In addition to joining the entry and exit sections, rolled over section 64 serves also to maintain reed plate 54 and its attached hardware in the proper orientation between the entry and exit sections.

Figure 6:
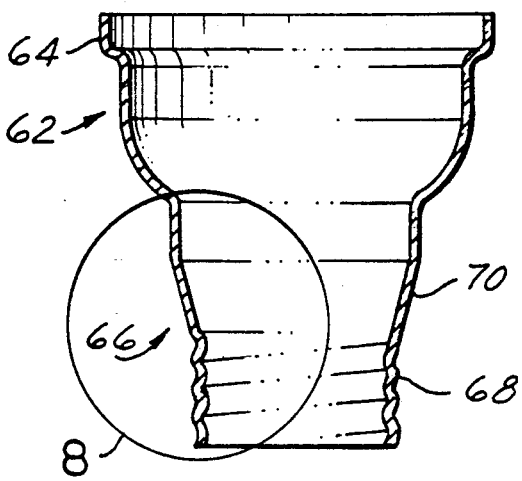
FIG. 6 is a section of the valve body of FIG. 5, taken along the line 6—6 of FIG. 5.
Figure 7:
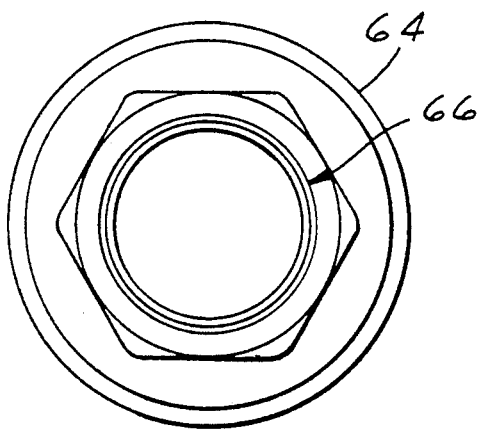
FIG. 7 is an end view of the valve body of FIG. 5, taken along the line 7—7 of FIG. 5.
Figure 8:
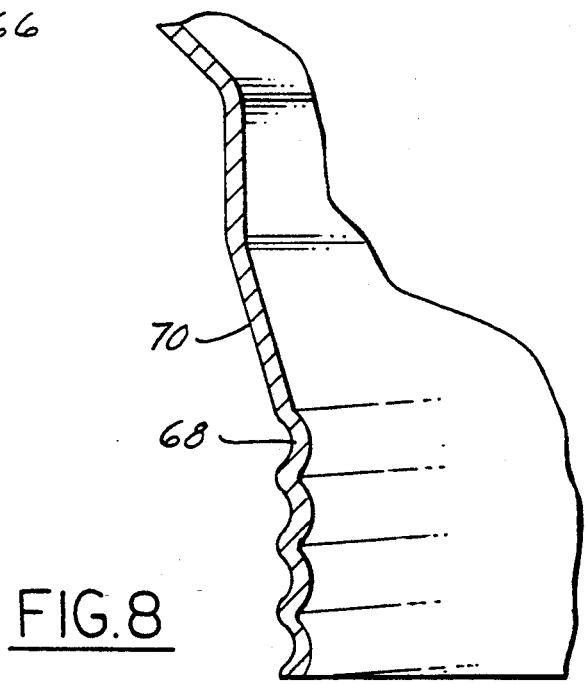
FIG. 8 is an enlarged view of a portion of the valve body which is circled in FIG. 6.

As shown in FIGS. 5 and 6, exit section 62 has a rolled thread, 68, formed in its second end 66. The rolled thread is preferably generated by the rolling process, which does not cut through the surface of the parent metal. As a result, the full thickness wall remains. Because the surface of the parent metal is not broken, a valve according to the present invention will not be subject to the corrosion which would otherwise result if threads were cut into the parent metal. More importantly, because first end 64 and second end 66 are of unitary construction, the problem previously described with crevice corrosion of prior art air injection valves such as that shown in FIG. 1 will be obviated.

Those skilled in the art will appreciate in view of this disclosure that an air injection valve according to the present invention could be made with exit section 62 of molded plastic material such as glass filled nylon, phenolic, or other types of metallic or nonmetallic compositions. Accordingly, thread 68 could be molded into exit section 62, as opposed to being rolled into the exit section.

A sealing system for maintaining a gas tight connection between valve 20 and socket 18 is shown in FIG. 4. Note that flared land 70 (shown best in FIG. 8) is provided in exit section 62 of valve 20 in an area which axially adjoins the threaded portion of the valve. Flared land 70 cooperates with an opposing flared land, 74, which comprises the termination of socket section 18. The interference fit provided by lands 70 and 74 gives a gas tight seal without the need for the pipe threaded connection used with the prior art valve illustrated in FIG. 1. As a result, the valve and mounting structure of the present invention may be lighter in weight than prior art devices.

Various modifications will no doubt occur to those skilled in the arts to which this invention pertains. All such modifications which basically rely on the teachings with which this disclosure has advanced the art are properly considered within the scope of this invention, as defined by the appended claims. By way of example, a secondary air injection valve according to one aspect of the present invention could be employed with a conventional air discharge manifold having a socket section fabricated from rigid stock. Alternatively, the socket could be formed from powdered or cast metal.

We claim:

1. An air injection valve for controlling secondary air flowing into the exhaust stream of an automotive engine from a source of atmospheric air, comprising:
    a tubular entry section including a first end having an adapter for receiving air from said source and an axially disposed second end;
    a unitary tubular exit section having a first end attached to the second end of said entry section and a second end having a thread formed therein to permit attachment to an air distribution manifold with said threaded portion of the second end comprising a full thickness wall which is plastically formed into a sinuous shape; and
    a control element interposed between said entry and exit sections so that the flow of air through said valve is modulated.

2. An air injection valve according to claim 1 wherein said thread in said exit section comprises a rolled thread.

3. An air injection valve and air discharge manifold for supplying secondary air from a source of pressurized atmospheric air to the exhaust stream of an automotive engine comprising:

an air injection valve for controlling the flow of air, comprising a tubular entry section including a first end having an adapter for receiving air and a second end which is axially disposed from the first end, a unitary tubular exit section having a first end attached to the second end of said entry section and a second end having a thread formed therein, and a control element interposed between said entry and exit sections so that the flow of air through said valve is modulated; and an air discharge manifold for mounting the air injection valve to the engine, comprising a socket section for receiving the second end of the air injection valve and a conduit section for conducting air to the exhaust stream of the engine with said socket section comprising a tubular structure having a full-thickness wall with a rolled thread formed therein and with the socket section being joined with the conduit section such that air passing into the air injection valve will be conducted to the exhaust stream of the engine.

4. An air injection valve and air discharge manifold for supplying atmospheric air to the exhaust stream of an automotive engine comprising:

an air injection valve for controlling the flow of air, comprising a tubular entry section including a first end having an adapter for receiving air and an axially opposed second end, a unitary tubular exit section having a first end attached to the second end of said entry section and a second end having a portion with a rolled thread formed therein, and a control element interposed between said entry and exit sections so that the flow of air through said valve is modulated; and an air discharge manifold for mounting the air injection valve to said engine, comprising a socket section for receiving the second end of the air injection valve and a conduit section for conducting air to the exhaust stream of the engine, with said socket section comprising a tubular structure having a rolled thread for engaging the threaded second end of the air injection valve.

5. An air injection valve and air discharge manifold according to claim 4, wherein the socket section terminates in a flared flange in sealing contact with a flared land at the base of the threaded portion of the air injection valve.

6. An air injection valve and air discharge manifold according to claim 4, wherein said engine has at least one cylinder head and the conduit section conducts air into the cylinder head of the engine.

* * * * *